United States Patent
Huang et al.

(10) Patent No.: US 12,069,751 B2
(45) Date of Patent: Aug. 20, 2024

(54) VEHICLE BATTERY SWAPPING METHOD, BATTERY SWAPPING STATION, VEHICLE AND SYSTEM

(71) Applicant: Contemporary Amperex Technology Co., Limited, Ningde (CN)

(72) Inventors: Zhenhui Huang, Ningde (CN); Hang Ma, Ningde (CN); Yongchao Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 333 days.

(21) Appl. No.: 17/706,650

(22) Filed: Mar. 29, 2022

(65) Prior Publication Data
US 2023/0063189 A1    Mar. 2, 2023

Related U.S. Application Data

(63) Continuation of application No. PCT/CN2021/115693, filed on Aug. 31, 2021.

(51) Int. Cl.
*B60S 5/06* (2019.01)
*H04W 76/11* (2018.01)
*H04W 84/20* (2009.01)

(52) U.S. Cl.
CPC .............. *H04W 76/11* (2018.02); *B60S 5/06* (2013.01); *H04W 84/20* (2013.01)

(58) Field of Classification Search
CPC .......... H04W 76/11; H04W 84/20; B60S 5/06
(Continued)

(56) References Cited

U.S. PATENT DOCUMENTS

2010/0292877 A1*  11/2010  Lee .................. B60L 50/66
                                                    180/68.5
2011/0123309 A1*  5/2011  Berdelle-Hilge ....... B60L 53/80
                                                    414/800
(Continued)

FOREIGN PATENT DOCUMENTS

CN        102045340 A     5/2011
CN        104834276 A     8/2015
(Continued)

OTHER PUBLICATIONS

The First Office Action for KR Application No. 10-2021-7036213, dated Sep. 8, 2023, 9 pages.
(Continued)

*Primary Examiner* — Chuck Huynh
(74) *Attorney, Agent, or Firm* — East IP P.C.

(57) ABSTRACT

Embodiments of the present application provides a vehicle battery swapping method. The method includes: under a condition that a target vehicle arrives at an entrance of the battery swapping station, collecting a vehicle identification of the target vehicle; obtaining a target network location address based on the vehicle identification and a stored first binding relationship, wherein the target network location address includes a network location address of a second management unit corresponding to the vehicle identification in the first binding relationship; based on the target network location address, initiating, by the first management unit, a wireless communication request to the second management unit corresponding to the target network location address; and under a condition that the first management unit successfully establishes a wireless communication connection with the second management unit corresponding to the target network location address, interacting with the second management unit to initiate a battery swapping process.

8 Claims, 8 Drawing Sheets

(58) Field of Classification Search
USPC .......................................................... 370/310
See application file for complete search history.

(56) References Cited

U.S. PATENT DOCUMENTS

| | | | |
|---|---|---|---|
| 2016/0023558 A1* | 1/2016 | Hika | H02J 50/80 320/108 |
| 2016/0368464 A1 | 12/2016 | Hassounah | |
| 2020/0402075 A1 | 12/2020 | Ebisu et al. | |

FOREIGN PATENT DOCUMENTS

| | | |
|---|---|---|
| CN | 205075673 U | 3/2016 |
| CN | 110843494 A | 2/2020 |
| CN | 111746335 A | 10/2020 |
| CN | 111885135 A | 11/2020 |
| CN | 112406618 A | 2/2021 |
| JP | 2011518710 A | 6/2011 |
| JP | 2014176234 A | 9/2014 |
| JP | 2019180226 A | 10/2019 |
| JP | 2022526110 A | 5/2022 |
| KR | 20110004292 A | 1/2011 |
| KR | 20130067868 A | 6/2013 |
| WO | 2020156771 A1 | 8/2020 |
| WO | 2021035298 A1 | 3/2021 |
| WO | 2021149467 A1 | 7/2021 |
| WO | 2021149468 A1 | 7/2021 |
| WO | 2021149488 A1 | 7/2021 |

OTHER PUBLICATIONS

The extended European search report for European Application No. 21827525.3, dated Apr. 3, 2023, 12 pages.
The International search report for PCT Application No. PCT/CN2021/115693, dated May 25, 2022, 7 pages.
The Second Office Action for JP Application No. 2021-561045, dated Mar. 7, 2024, 7 pages.
The First Office Action for JP Application No. 2021-561045, dated Nov. 2, 2023, 13 pages.
The Written Decision on Registration for KR Application No. 10-2021-7036213, dated Apr. 24, 2024, 10 pages.

* cited by examiner

VEHICLE BATTERY SWAPPING METHOD, BATTERY SWAPPING STATION, VEHICLE AND SYSTEM

CROSS-REFERENCE TO RELATED APPLICATION

The present application is a continuation of International Application No. PCT/CN2021/115693, filed on Aug. 31, 2021, which is incorporated herein by reference in its entirety.

TECHNICAL FIELD

The present application relates to the technical field of batteries, and in particular, to a vehicle battery swapping method, a battery swapping station, a vehicle and a system.

BACKGROUND

With the development of new energy technology, application fields of batteries have become more and more extensive. For example, a battery may be used as a power source to supply power for a vehicle, which reduces the use of non-renewable resources.

Under a condition that the power of a battery in a vehicle is not enough to support the vehicle to continue driving, a charging device such as a charging pile may be used to charge the vehicle, that is, to charge the battery in the vehicle, to realize a charge and discharge cycle use of the battery. However, it takes a long time to charge the battery, which limits the endurance of the vehicle.

In order to improve an endurance utilization rate of a vehicle, battery swapping technology has emerged as the times require. A vehicle may realize an endurance of the vehicle by replacing a battery with insufficient power with a battery with sufficient power in a battery swapping station. However, in the battery swapping station, it is necessary to manually operate related devices for battery swapping in the battery swapping station, and the efficiency of battery swapping still needs to be improved.

SUMMARY

Embodiments of the present application provide a vehicle battery swapping method, a battery swapping station, a vehicle and a system.

In a first aspect, the embodiments of the present application provide a vehicle battery swapping method applied to a battery swapping station, wherein the battery swapping station includes a first management unit having a wireless communication function, and the method includes: under a condition that a target vehicle arrives at an entrance of the battery swapping station, collecting a vehicle identification of the target vehicle; obtaining a target network location address based on the vehicle identification of the target vehicle and a stored first binding relationship, wherein the first binding relationship includes a correspondence relationship between vehicle identifications of vehicles and network location addresses of second management units in the vehicles, and the target network location address includes a network location address of a second management unit corresponding to the vehicle identification of the target vehicle in the first binding relationship; based on the target network location address, initiating, by the first management unit, a wireless communication request to the second management unit corresponding to the target network location address; and under a condition that the first management unit successfully establishes a wireless communication connection with the second management unit corresponding to the target network location address, interacting with the second management unit corresponding to the target network location address to initiate a battery swapping process.

In a second aspect, the embodiments of the present application provide a vehicle battery swapping method applied to a second management unit in a vehicle, wherein the second management unit has a wireless communication function, and the method includes: after the vehicle enters a battery swapping station, receiving a wireless communication request transmitted by a first management unit in the battery swapping station, wherein the wireless communication request is transmitted by the first management unit based on an acquired target network location address, the target network location address is a network location address corresponding to a vehicle identification of the vehicle in a first binding relationship stored in the battery swapping station, and the first binding relationship includes a correspondence relationship between a network location address of the second management unit of the vehicle and the vehicle identification of the vehicle; and in response to the wireless communication request, establishing a wireless communication connection with the first management unit in the battery swapping station, and interacting with the first management unit in the battery swapping station to initiate a battery swapping process.

In a third aspect, the embodiments of the present application provide a battery swapping station including: an information collection device configured to: under a condition that a target vehicle arrives at an entrance of the battery swapping station, collect a vehicle identification of the target vehicle, and upload the vehicle identification of the target vehicle to a management device; the management device configured to: obtain a target network location address based on the vehicle identification of the target vehicle and a stored first binding relationship, and deliver the target network location address to a first management unit, wherein the first binding relationship includes a correspondence relationship between vehicle identifications of vehicles and network location addresses of second management units in the vehicles, and the target network location address includes a network location address of a second management unit corresponding to the vehicle identification of the target vehicle in the first binding relationship; and the first management unit having a wireless communication function and configured to: initiate a wireless communication request to the second management unit corresponding to the target network location address based on the target network location address, and under a condition that the first management unit successfully establishes a wireless communication connection with the second management unit corresponding to the target network location address, initiate a battery swapping process.

In a fourth aspect, the embodiments of the present application provide a vehicle, including a second management unit, wherein the second management unit has a wireless communication function and is configured to: after the vehicle enters the battery swapping station, receive a wireless communication request transmitted by a first management unit in the battery swapping station, wherein the wireless communication request is transmitted by the first management unit based on an acquired target network location address, the target network location address is a network location address corresponding to a vehicle identification of the vehicle in a first binding relationship stored in the battery swapping station, and the first binding relationship includes a correspondence relationship between a network location address of the second management unit of the vehicle and the vehicle identification of the vehicle; and in response to the wireless communication request, establish a wireless communication connection with the first management unit in the battery swapping station, and interact with the first management unit in the battery swapping station to initiate a battery swapping process.

In a fifth aspect, the embodiments of the present application provide a vehicle battery swapping system including: a battery swapping station configured to perform the vehicle battery swapping method of the first aspect; and a vehicle including a second management unit configured to perform the vehicle battery swapping method of the second aspect.

BRIEF DESCRIPTION OF THE DRAWINGS

In order to more clearly describe technical solutions of the embodiments of the present application, the drawings that need to be used in the embodiments of the present application will be briefly introduced below. Obviously, the drawings described below are only some embodiments of the present application. For those of ordinary skill in the art, without creative work, other drawings can be obtained based on the drawings.

DETAILED DESCRIPTION

Figure 1:
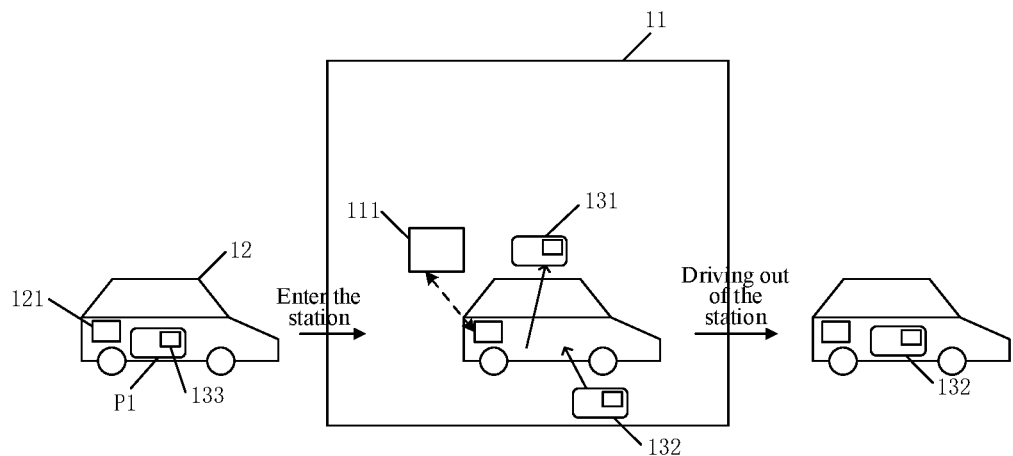
FIG. 1 is a schematic diagram of an example of an application scenario of a vehicle battery swapping method provided by an embodiment of the present application.

The implementation of the present application will be described in further detail below in conjunction with the drawings and embodiments. The detailed description and drawings of the following embodiments are used to exemplarily illustrate the principle of the present application, but cannot be used to limit the scope of the present application, that is, the present application is not limited to the described embodiments.

In the description of the present application, it should be noted that, unless otherwise stated, "a plurality" means two or more; an orientation or positional relationship indicated by the terms "upper", "lower", "left", "right", "inside" and "outside" is only for the convenience of describing the present application and simplifying the description, rather than indicating or implying that the referred apparatus or element must have a specific orientation, be constructed and operated in a specific orientation, and therefore cannot be understood as a limitation of the present application. In addition, the terms "first", "second", "third", etc. are merely used for descriptive purposes, and cannot be understood as indicating or implying relative importance. "Vertical" is not strictly vertical, but within an allowable range of error. "Parallel" is not strictly parallel, but within an allowable range of error.

The words of orientation appearing in the following description are all directions shown in the figures, and do not limit the specific structure of the present application. In the description of the present application, it should also be noted that, unless otherwise clearly specified and limited, the terms "installing", "coupling", and "connecting" should be understood in a broad sense, for example, it can be a fixed connection, a detachable connection, or an integral connection; it can be directly connected, or indirectly connected through an intermediate medium. For those of ordinary skill in the art, the specific meanings of the above-mentioned terms in the present application can be understood according to specific circumstances.

With the development of new energy technology, application fields of batteries have become more and more extensive. For example, a battery may be used as a power source to supply power for a vehicle, which reduces the use of non-renewable resources. Under a condition that the power of a battery in a vehicle is not enough to support the vehicle to continue driving, a charging device such as a charging pile may be used to charge the vehicle, that is, to charge the battery in the vehicle, to realize a charge and discharge cycle use of the battery. However, it takes a long time to charge the battery, which limits the endurance of the vehicle.

In order to improve an endurance utilization rate of a vehicle, battery swapping technology has emerged as the times require. The battery swapping technology adopts a manner of "separation of vehicle and electricity", and can provide a battery replacement service for a vehicle through a battery swapping station, that is, a battery can be quickly removed from or installed to the vehicle. However, at this stage, in the battery swapping station, it is necessary to manually operate related devices for battery swapping in the battery swapping station, and the efficiency of battery swapping still needs to be improved.

The embodiments of the present application may provide a vehicle battery swapping method, a battery swapping station, a vehicle, and a system. The battery swapping station can enable, based on a vehicle identification of a vehicle, a management unit in the battery swapping station and a management unit in the vehicle to establish a wireless communication connection, thereby interacting through the wireless communication connection to automatically initiate a battery swapping process, which realizes the automation of battery swapping in the battery swapping station, without manual operation, so as to improve the efficiency of battery swapping.

In order to facilitate understanding, an application scenario of a vehicle battery swapping method provided by the embodiments of the present application will be described, as an example, below first. FIG. 1 is a schematic diagram of an example of an application scenario of a vehicle battery swapping method provided by an embodiment of the present application. As shown in FIG. 1, the vehicle battery swapping method may involve a battery swapping station 11, a vehicle 12 and batteries.

The battery swapping station 11 may refer to a place that provides a battery swapping service for a vehicle. For example, the battery swapping station 11 may be a fixed place, or the battery swapping station 11 may be a movable place such as a mobile battery-swapping vehicle, which is not limited herein.

In the embodiments of the present application, as shown in FIG. 1, the battery swapping station 11 may include a first management unit 111. In some examples, the first management unit 111 may be a battery management unit arranged in the battery swapping station, for example, the first management unit 111 may be referred to as a tube battery management unit (TBMU) of the battery swapping station. The first management unit 111 has a wireless communication function, and can establish a wireless communication connection with other units, modules, devices, etc. having a wireless communication function, and interact with other units, modules, devices, etc. having a wireless communication function through the wireless communication connection. The wireless communication function of the first management unit 111 may include a Bluetooth communication function, a WiFi communication function, a ZigBee communication function, etc., which is not limited herein.

The vehicle 12 may be detachably connected to a battery. In some examples, the vehicle 12 may be a vehicle that uses a power battery as a power source, such as a car, a truck, or the like.

In the embodiments of the present application, the vehicle 12 has a second management unit 121. In some examples, the second management unit 121 may be a battery management unit arranged in the vehicle, for example, the second management unit 121 may be referred to as a master battery management unit (MBMU). The second management unit 121 has a wireless communication function, and can establish a wireless communication connection with other units, modules, devices, etc. having a wireless communication function, and interact with other units, modules, devices, etc. having a wireless communication function through the wireless communication connection. The wireless communication function of the second management unit 121 may include a Bluetooth communication function, a WiFi communication function, a ZigBee communication function, etc., which is not limited herein.

The batteries may include a battery arranged in the vehicle 12 and a battery located in the battery swapping station 11 for battery swapping. The battery used for battery swapping in the battery swapping station 11 may be placed in a battery swapping cabinet 112 of the battery swapping station 11, which is not limited herein. For ease of distinction, as shown in FIG. 1, the battery in the vehicle 12 is denoted as a battery 131, and the battery used for battery swapping in the battery swapping station is denoted as a battery 132.

The battery may be a lithium ion battery, a lithium metal battery, a lead-acid battery, a nickel cadmium battery, a nickel hydrogen battery, a lithium sulfur battery, a lithium air battery, or a sodium ion battery, etc., which is not limited herein. The battery may be a battery cell, a battery module or a battery pack, which is not limited herein. In addition to being used as a power source to supply power for a motor of the vehicle 12, the battery may also supply power for other electrical devices in the vehicle 12, for example, the battery may also supply power for an in-vehicle air conditioner, an on-board player, etc.

The battery may also be provided with a third management unit 133 correspondingly. In some examples, the third management unit 133 may be a battery management unit corresponding to the battery, for example, the third management unit 133 may be referred to as a slave battery management unit (SBMU). The third management unit 133 has a wireless communication function, and can establish a wireless communication connection with other units, modules, devices, etc. having a wireless communication function, and interact with other units, modules, devices, etc. having a wireless communication function through the wireless communication connection. The wireless communication function of the third management unit 133 may include a Bluetooth communication function, a WiFi communication function, a ZigBee communication function, etc., which is not limited herein.

As shown in FIG. 1, when the vehicle 12 enters the battery swapping station 11, the battery swapping station 11 can take out the battery 131 with insufficient power in the vehicle 12, and install the battery 132 with sufficient power in the battery swapping station 11 to the vehicle 12. After the battery 132 with sufficient power is installed to the vehicle 12, the vehicle 12 completes battery swapping and drives out of the battery swapping station 11. The embodiments of the present application can realize the automation of battery swapping in the battery swapping station 11, and can complete battery swapping of the vehicle 12 within a few minutes or even tens of seconds, which improves the efficiency of battery swapping.

In some embodiments, the battery swapping station 11 may also be provided with a management device correspondingly. The management device may be a centralized structure or a distributed structure, which is not limited herein. The management device may be arranged in the battery swapping station 11, or may be arranged outside the battery swapping station 11. Under a condition that the management device is a distributed structure, the management device may also be partly arranged in the battery swapping station 11 and partly arranged outside the battery swapping station 11. The management device may be implemented as an in-station computer and/or a remote server of the battery swapping station, which is not limited herein.

Figure 2:
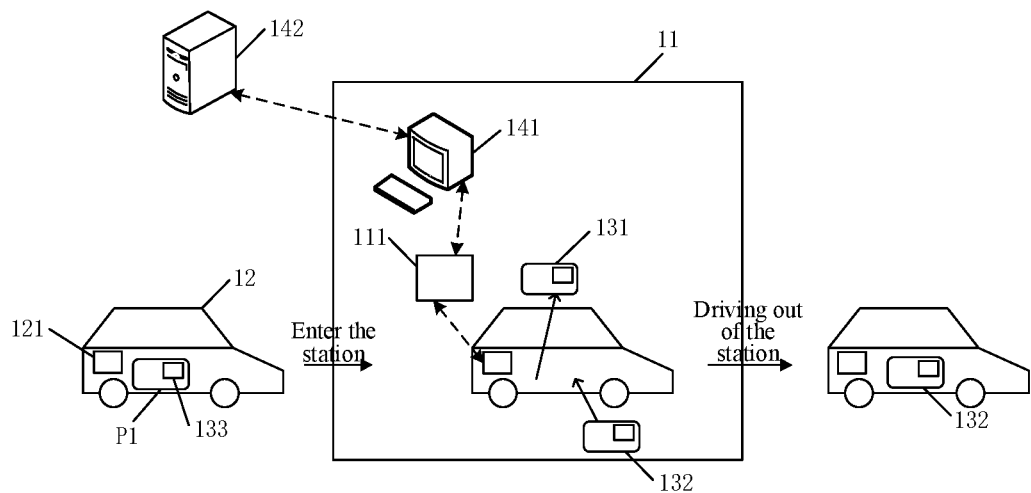
FIG. 2 is a schematic diagram of another example of an application scenario of a vehicle battery swapping method provided by an embodiment of the present application.

FIG. 2 is a schematic diagram of another example of an application scenario of a vehicle battery swapping method provided by an embodiment of the present application. The difference between FIG. 2 and FIG. 1 is that the application scenario shown in FIG. 2 may also include an in-station computer 141 and a remote server 142 of the battery swapping station. The in-station computer 141 may perform wired or wireless communication with the first management unit 111, which is not limited herein. The in-station computer 141 may acquire information regarding the battery in the vehicle 12 and information regarding the battery used for battery swapping in the battery swapping station 11 through the first management unit 111 and the second management unit 121, and transmit related instructions to the first management unit 111, and so on. The remote server 142 may communicate and interact with the in-station computer 141 to acquire information regarding the battery in the vehicle 12 and information regarding the battery used for battery swapping in the battery swapping station 11 from the in-station computer 141, and transmit related instructions to the in-station computer 141, and so on.

A vehicle battery swapping method, a battery swapping station, a vehicle and a system will be described below in sequence.

Figure 3:
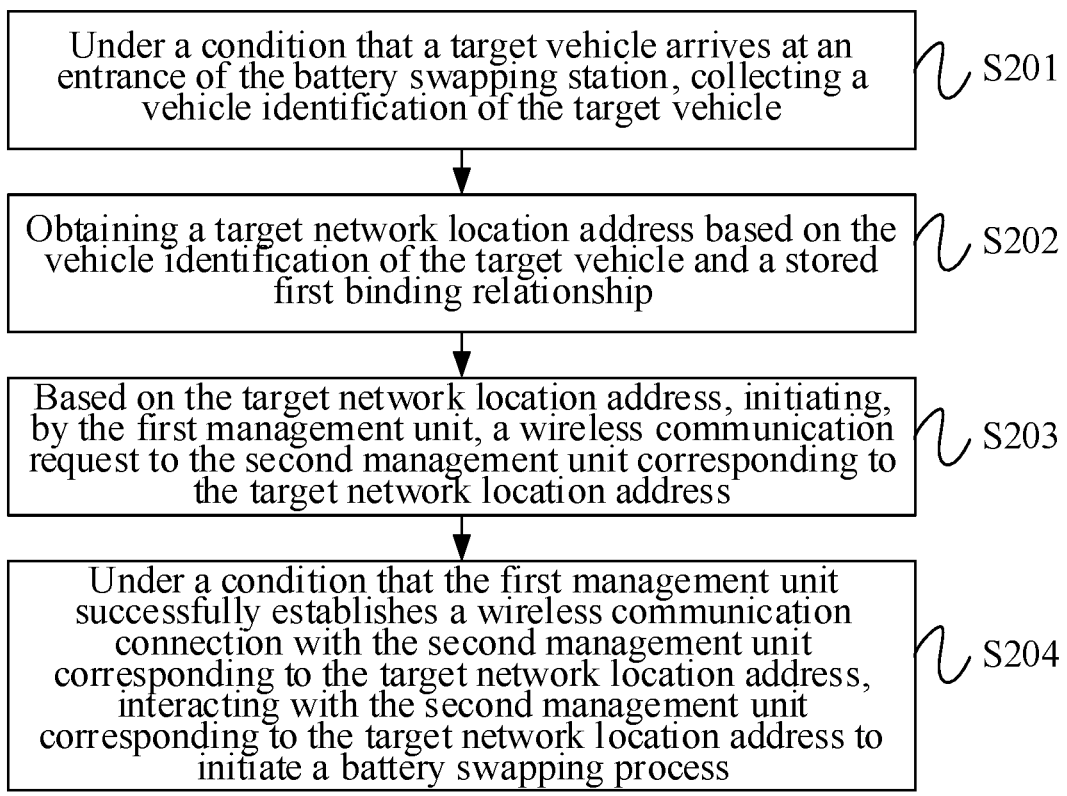
FIG. 3 is a flowchart of an embodiment of a vehicle battery swapping method applied to a battery swapping station provided by the present application.

The first aspect of the present application provides a vehicle battery swapping method, which may be applied to a battery swapping station. Specific contents of the battery swapping station may refer to the above-mentioned relevant description, which will not be repeated herein. The following description will be given by taking, as an example, the battery in the vehicle as a battery pack. FIG. 3 is a flowchart of an embodiment of a vehicle battery swapping method applied to a battery swapping station provided by the present application. As shown in FIG. 3, the vehicle battery swapping method may include step S201 to step S204.

In step S201, under a condition that a target vehicle arrives at an entrance of the battery swapping station, a vehicle identification of the target vehicle is collected.

The target vehicle may refer to a vehicle having a battery to be replaced. The vehicle identification may be used to identify a vehicle, that is, different vehicles have different vehicle identifications. The vehicle identification may include a license plate number, a unique identification code of a vehicle, a product serial number of a vehicle component, etc., which is not limited herein. The vehicle identification may be arranged outside the vehicle, or carried in a readable and writable device, such as a radio frequency identification (RFID) tag, wherein the vehicle identification carried in the radio frequency identification tag may be read through a radio frequency tag reader. When the vehicle identification is carried in a readable and writable device such as a radio frequency identification tag, the readable and writable device such as a radio frequency identification tag may also store other information such as a network location address of the second management unit in the vehicle, which is not limited herein. At least part of the information stored in a readable and writable device such as a radio frequency identification tag may be encrypted information, which is not limited herein. Encrypting the information in a readable and writable device such as a radio frequency identification tag can prevent leakage of information in the readable and writable device such as a radio frequency identification tag to ensure information security of the vehicle.

In some examples, a vehicle identification collection device may be arranged at the entrance of the battery swapping station, and the vehicle identification collection device may be configured to collect the vehicle identification of the target vehicle. A collection area may also be arranged at the entrance of the battery swapping station, and the vehicle identification collection device may be specifically arranged at a specific location in the collection area. The vehicle may be parked in the collection area when driving to the entrance of the battery swapping station, to enable the vehicle identification collection device to collect the vehicle identification.

For example, if the vehicle identification is a license plate number, the vehicle identification collection device may be an image collection device, and the image collection device such as a camera takes a picture of the license plate number to identify the license plate number obtained by shooting. For another example, the vehicle identification is a unique identification code of a vehicle, the identification code of the vehicle may be stored in a radio frequency identification tag which may be arranged in the vehicle body or inside the vehicle, and the vehicle identification collection device may be a radio frequency identification tag reader. When the vehicle is parked in the collection area, the radio frequency identification tag of the vehicle is aligned with the vehicle identification collection device, so that the vehicle identification collection device may read information stored in the radio frequency identification tag.

In step S202, a target network location address is obtained based on the vehicle identification of the target vehicle and a stored first binding relationship.

The first binding relationship includes a correspondence relationship between vehicle identifications of vehicles and network location addresses of second management units in the vehicles. The target network location address includes a network location address of a second management unit corresponding to the vehicle identification of the target vehicle in the first binding relationship. That is, the target network location address is the network location address of the second management unit in the target vehicle. A type of the network location address may be set based on the wireless communication function of the first management unit and the wireless communication function of the second management unit, which is not limited herein. For example, the network location address may specifically include a media access control address (MAC address).

In some examples, the battery swapping station may be provided with a management device correspondingly, and the first binding relationship may be stored in the management device. Relevant contents of the management device may refer to the above-mentioned relevant description, which will not be repeated herein. For example, the management device includes an in-station computer, and then the first binding relationship may be stored in the in-station computer. For another example, the management device may include an in-station computer and a remote server, and then the first binding relationship may be stored in the remote server, and transmitted from the remote server to the in-station computer. The management device may obtain the target network location address based on the vehicle identification of the target vehicle and the stored first binding relationship, and transmit the target network location address to the first management unit.

In step S203, based on the target network location address, the first management unit initiates a wireless communication request to the second management unit corresponding to the target network location address.

After the battery swapping station acquires the target network location address, the first management unit may use the target network location address to initiate a wireless communication request to the second management unit of the target vehicle. The wireless communication request is used to request to establish a wireless communication connection with the second management unit.

The first management unit uses the network location address corresponding to the vehicle identification of the target vehicle in the first binding relationship to initiate a wireless communication request to the second management unit corresponding to the network location address, which can avoid a wireless communication connection with a second management unit in an illegal vehicle, and thus avoid battery swapping for illegal vehicles, so as to protect battery swapping rights of legal vehicles. Illegal vehicles may include unlicensed vehicles, illegally assembled vehicles, and so on.

In step S204, under a condition that the first management unit successfully establishes a wireless communication connection with the second management unit corresponding to the target network location address, the first management unit interacts with the second management unit corresponding to the target network location address to initiate a battery swapping process.

After the first management unit successfully establishes a wireless communication connection with the second management unit corresponding to the target network location address, that is, after the first management unit successfully establishes a wireless communication connection with the second management unit of the target vehicle, the first management unit may interact with the second management unit of the target vehicle. For example, the first management unit may interact with the second management unit to assist in information or instructions for battery swapping, such as battery status information of a battery pack in the target vehicle, charging parameter information of the battery pack, and battery swapping instructions, which is not limited herein.

In the embodiments of the present application, the battery swapping station may obtain, based on the vehicle identification of the target vehicle, the target network location address corresponding to the vehicle identification of the target vehicle in the correspondence relationship between vehicle identifications and network location addresses of second management units, that is, the network location address of the second management unit of the target vehicle. The first management unit in the battery swapping station actively establishes a wireless communication connection with the second management unit of the target vehicle, and can interact through the established wireless communication connection to complete the interaction of information and instructions required for battery swapping, thereby automatically initiating the battery swapping process. After the target vehicle arrives at the entrance of the battery swapping station, the battery swapping station can automatically initiate the battery swapping process without manual operation, which improves the efficiency of battery swapping.

Figure 4:
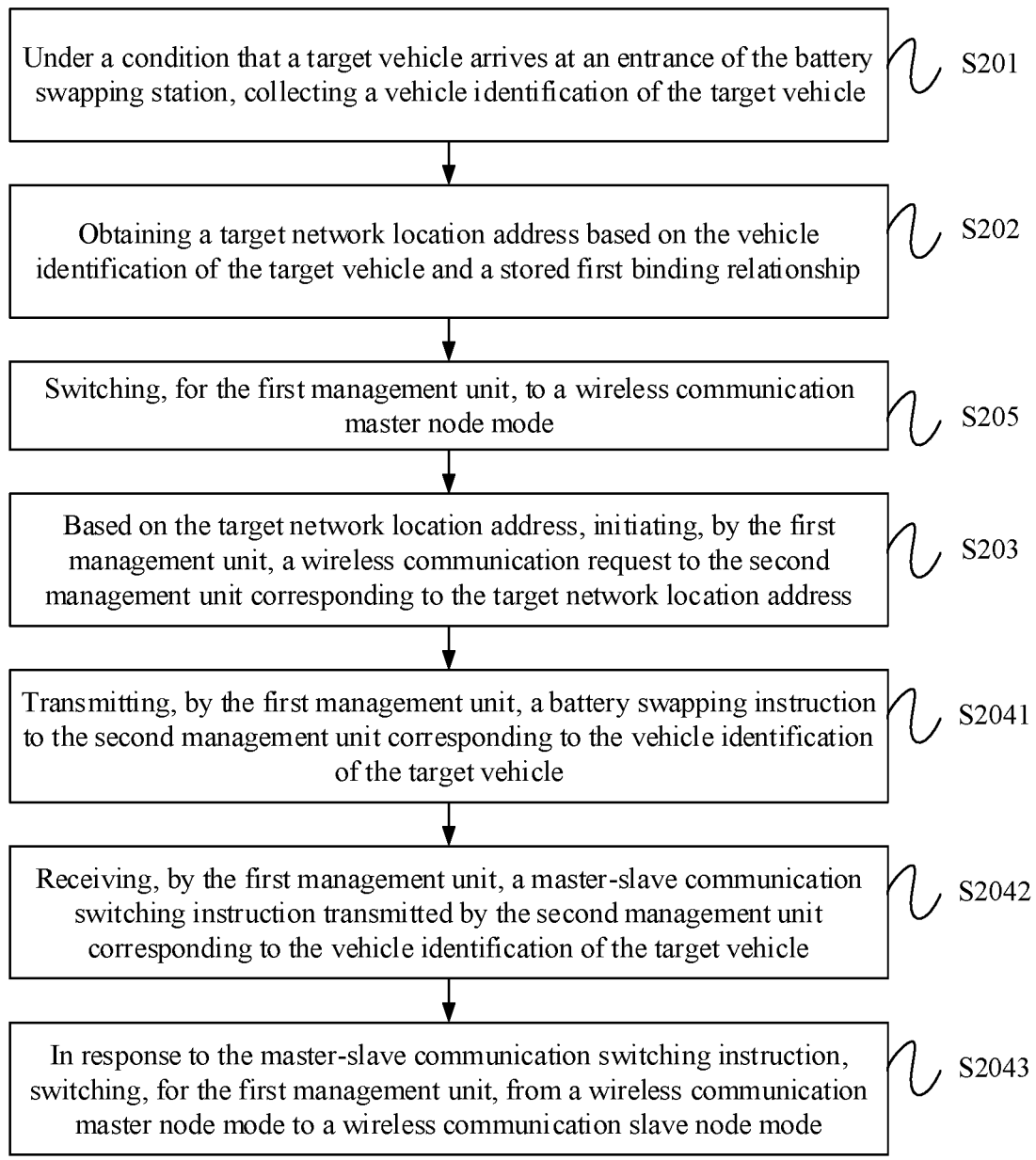
FIG. 4 is a flowchart of another embodiment of a vehicle battery swapping method applied to a battery swapping station provided by the present application.

In some embodiments, in order to facilitate the first management unit to initiate a wireless communication connection to the second management unit of the target vehicle, the first management unit may switch to a wireless communication master node mode. FIG. 4 is a flowchart of another embodiment of a vehicle battery swapping method applied to a battery swapping station provided by the present application. The difference between FIG. 4 and FIG. 3 is that the vehicle battery swapping method shown in FIG. 4 may further include step S205, and step S204 in FIG. 3 may be specifically refined into step S2041 to step S2043 in FIG. 4.

In step S205, the first management unit switches to the wireless communication master node mode.

After obtaining the target network location address, the first management unit may switch to the wireless communication master node mode. After switching to the wireless communication master node mode, the first management unit may initiate a wireless communication request to a device, an apparatus, a component, etc. in a wireless communication slave node mode. The first management unit in the wireless communication master node mode may initiate, as a wireless communication master node, a wireless communication request to multiple devices, apparatuses, components, etc. in the wireless communication slave node mode, and may establish a wireless communication connection with multiple devices, apparatuses, components, etc. in the wireless communication slave node mode.

In some examples, the first management unit of the battery swapping station switches to the wireless communication master node mode, and under a condition that multiple vehicles enter the battery swapping station, the first management unit may initiate a wireless communication connection to second management units in the multiple vehicles, and establish a wireless communication connection with the second management units in the multiple vehicles. Specific contents of a process of initiating and establishing a wireless communication connection between the first management unit and each of the second management units in vehicles may refer to relevant description in the above-mentioned embodiments, which will not be repeated herein.

In step S2041, the first management unit transmits a battery swapping instruction to the second management unit corresponding to the vehicle identification of the target vehicle.

The battery swapping instruction may be used to instruct battery swapping. Under a condition that the second management unit receives the battery swapping instruction, related operations of the battery swapping process begin to be performed.

In step S2042, the first management unit receives a master-slave communication switching instruction transmitted by the second management unit corresponding to the vehicle identification of the target vehicle.

The master-slave communication switching instruction is transmitted by the second management unit corresponding to the vehicle identification of the target vehicle in response to the battery swapping instruction. That is, the second management unit of the target vehicle may transmit the master-slave communication switching instruction to the first management unit in the case of receiving the battery swapping instruction.

In step S2043, in response to the master-slave communication switching instruction, the first management unit switches from the wireless communication master node mode to the wireless communication slave node mode.

In the battery swapping process, the second management unit of the vehicle not only needs to establish a wireless communication connection with the first management unit, but also needs to establish a wireless communication connection with the third management unit of the battery pack. That is, the second management unit of the vehicle also needs to initiate a wireless communication request to the third management unit of the battery pack, and the second management unit of the vehicle may switch to the wireless communication master node mode to initiate a communication connection request to the third management unit. The second management unit of the vehicle switches to be the wireless communication master node. Correspondingly, the first management unit switches to be a wireless communication slave node. Therefore, the first management unit may switch from the wireless communication master node mode to the wireless communication slave node mode in the case of receiving the master-slave communication switching instruction transmitted by the second management unit.

With the development of wireless communication technology, some wireless communication technologies no longer limit that a wireless communication request may only be initiated by a device, an apparatus, a component, etc. in the wireless communication master node mode, and a device, an apparatus, a component, etc. in the wireless communication slave node mode may also initiate a wireless communication request. In the embodiments of the present application, the first management unit, the second management unit, the third management unit, etc. may also not switch between the wireless communication master node mode and the wireless communication slave node mode, and initiate a wireless communication request normally to establish a wireless communication connection, which is not limited herein.

The first management unit of the battery swapping station can directly interact, via wireless communication, with the second management unit of the target vehicle to realize the initiation of the battery swapping process, and there is no need for the whole vehicle to cooperate with the battery swapping station to communicate, and thus the applicability is stronger.

Figure 5:
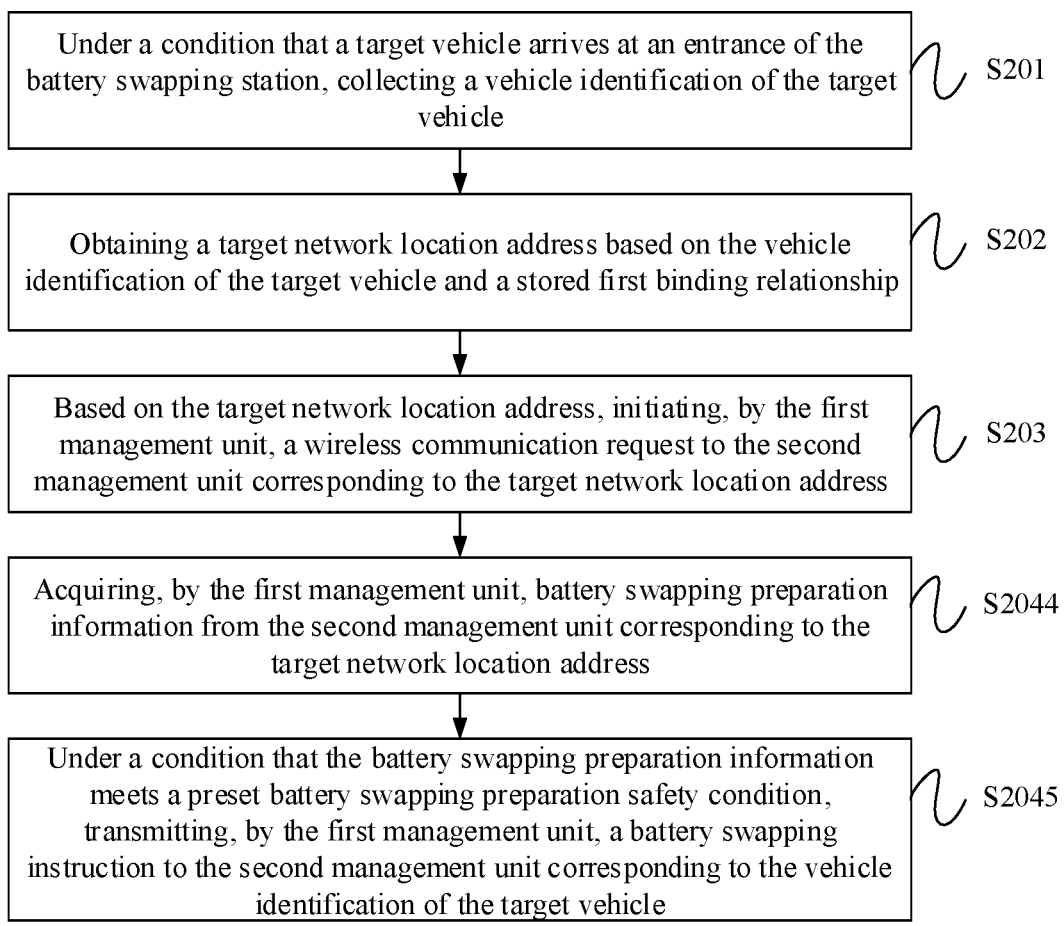
FIG. 5 is a flowchart of yet another embodiment of a vehicle battery swapping method applied to a battery swapping station provided by the present application.

In some embodiments, in order to further ensure the safety and enforceability of battery swapping for a vehicle in the battery swapping station, the second management unit may also provide relevant information regarding the battery pack used to assist in battery swapping, so as to ensure that battery swapping is performed normally. FIG. 5 is a flowchart of yet another embodiment of a vehicle battery swapping method applied to a battery swapping station provided by the present application. The difference between FIG. 5 and FIG. 3 is that step S204 in FIG. 3 may be specifically refined into step S2044 and step S2045 in FIG. 5.

In step S2044, the first management unit obtains battery swapping preparation information from the second management unit corresponding to the target network location address.

The battery swapping preparation information is information related to preparation measures taken by the battery pack for battery swapping, which may be specifically selected based on requirements of the vehicle and the battery swapping station, experiences, etc., which is not limited herein. The battery swapping preparation information is acquired by the second management unit from the third management unit of the battery pack of the target vehicle. The second management unit may establish a wireless communication connection with the third management unit, and acquire, via an interaction, the battery swapping preparation information of the battery pack from the third management unit. Under a condition that the second management unit of the vehicle may establish a wireless communication connection with the third management unit of the battery pack to be replaced in the vehicle after the vehicle enters the battery swapping station, the third management unit may periodically transmit the battery swapping preparation information to the second management unit. Alternatively, under a condition that the battery swapping preparation information of the battery pack changes, the third management unit transmits the battery swapping preparation information to the second management unit, which is not limited herein.

In step S2045, under a condition that the battery swapping preparation information meets a preset battery swapping preparation safety condition, the first management unit transmits a battery swapping instruction to the second management unit corresponding to the vehicle identification of the target vehicle.

The battery swapping preparation safety condition is a condition used to determine whether battery swapping preparation of the battery pack of the vehicle is safe, which may be set based on requirements of the vehicle and the battery pack, experiences, etc., which is not limited herein. If the battery swapping preparation information meets the battery swapping preparation safety condition, it indicates that battery swapping preparation of the battery pack of the vehicle is safe, and the battery pack of the vehicle may be replaced. The first management unit may upload the battery swapping preparation information to the management device of the battery swapping station, and the management device determines whether the battery swapping preparation information meets the battery swapping preparation safety condition, and under a condition that the battery swapping preparation information meets the battery swapping preparation safety condition, controls the first management unit to transmit a battery swapping instruction to the second management unit.

In some examples, the battery swapping preparation information may include an on-off state of a relay of the battery pack and a switch state of a battery swapping lock structure of the battery pack. The battery swapping preparation safety condition includes: the on-off state of the relay of the battery pack is an off state, and the switch state of the battery swapping lock structure of the battery pack is an unlocked state. If the on-off state of the relay of the battery pack is an off state, it indicates that the vehicle has been powered off. The relay of the battery pack may include a branch relay in the battery pack, and a main-circuit relay corresponding to the vehicle and the battery pack, which is not limited herein. If the switch state of the battery swapping lock structure of the battery pack is an unlocked state, it indicates that the battery pack may be taken out of the vehicle.

Based on the battery swapping preparation information and the battery swapping preparation safety condition, the battery swapping process is performed only when battery swapping preparation of the battery pack of the target vehicle is safe, thereby ensuring the safety and reliability of battery swapping.

Figure 6:
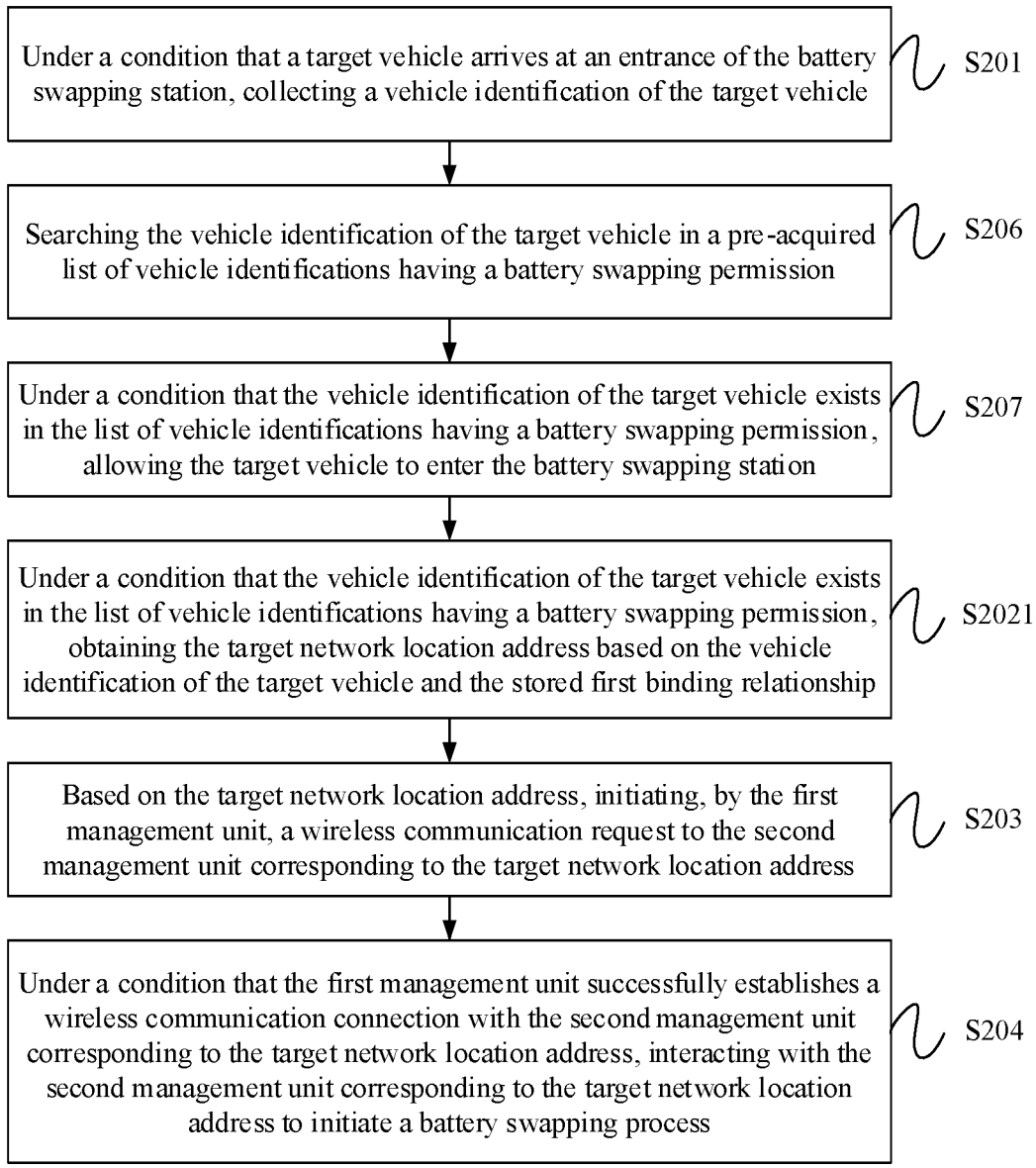
FIG. 6 is a flowchart of still another embodiment of a vehicle battery swapping method applied to a battery swapping station provided by the present application.

In some embodiments, the target vehicle may also be authenticated to ensure the reliability and controllability of battery swapping. FIG. 6 is a flowchart of still another embodiment of a vehicle battery swapping method applied to a battery swapping station provided by the present application. The difference between FIG. 6 and FIG. 3 is that the vehicle battery swapping method shown in FIG. 6 may further include step S206 and step S207, and step S202 in FIG. 3 may be specifically refined into step S2021.

In step S206, the vehicle identification of the target vehicle is searched in a pre-acquired list of vehicle identifications having a battery swapping permission.

The list of vehicle identifications having a battery swapping permission includes vehicle identifications of vehicles having a battery swapping permission. The vehicle identification of the target vehicle is searched in the list of vehicle identifications having a battery swapping permission to determine whether the target vehicle has a battery swapping permission. The list of vehicle identifications having a battery swapping permission may be stored in the management device of the battery swapping station, and the management device searches the vehicle identification of the target vehicle in the list of vehicle identifications having a battery swapping permission. The vehicle identification of the target vehicle may be searched, by the in-station computer, in the list of vehicle identifications having a battery swapping permission, or the vehicle identification of the target vehicle may be searched, by the remote server, in the list of vehicle identifications having a battery swapping permission.

In step S207, under a condition that the vehicle identification of the target vehicle exists in the list of vehicle identifications having a battery swapping permission, the target vehicle is allowed to enter the battery swapping station.

The list of vehicle identifications having a battery swapping permission may include vehicle identifications of vehicles that make reservations for battery swapping in advance, vehicle identifications of vehicles that have opened a battery swapping service, and the like. If the vehicle identification of the target vehicle exists in the list of vehicle identifications having a battery swapping permission, it means that the target vehicle has a battery swapping permission, and the target vehicle is allowed to enter the battery swapping station. If the vehicle identification of the target vehicle does not exist in the list of vehicle identifications having a battery swapping permission, it means that the target vehicle does not have a battery swapping permission, and the target vehicle is not allowed to enter the battery swapping station.

The battery swapping station may be provided with a barrier gate which may be controlled by the management device of the battery swapping station. Under a condition that the management device determines that the vehicle identification of the target vehicle exists in the list of vehicle identifications having a battery swapping permission, the management device may control the barrier gate to open so as to enable the target vehicle to enter the battery swapping station. Under a condition that the management device determines that the vehicle identification of the target vehicle does not exist in the list of vehicle identifications having a battery swapping permission, the management device may control the barrier gate to close so as to deny the target vehicle to enter the battery swapping station.

In step S2021, under a condition that the vehicle identification of the target vehicle exists in the list of vehicle identifications having a battery swapping permission, the target network location address is obtained based on the vehicle identification of the target vehicle and the stored first binding relationship.

Only when it is determined that the target vehicle has a battery swapping permission, the target network location address is allowed to be obtained, so that the first management unit of the battery swapping station can establish a wireless communication connection with the second management unit of the target vehicle.

Whether the target vehicle has a battery swapping permission is determined based on the list of vehicle identifications having a battery swapping permission. The battery swapping station only allows vehicles having a battery swapping permission to enter, which can ensure the reliability and controllability of the battery swapping process.

In some embodiments, the battery swapping station may include multiple battery swapping areas. Under a condition that the target vehicle arrives at the entrance of the battery swapping station, whether there is an idle battery swapping area in the battery swapping station may also be determined. If the battery swapping station has an idle battery swapping area, the target vehicle is allowed to enter the battery swapping station, and if the battery swapping station does not have an idle battery swapping area, the target vehicle is denied to enter the battery swapping station.

Figure 7:
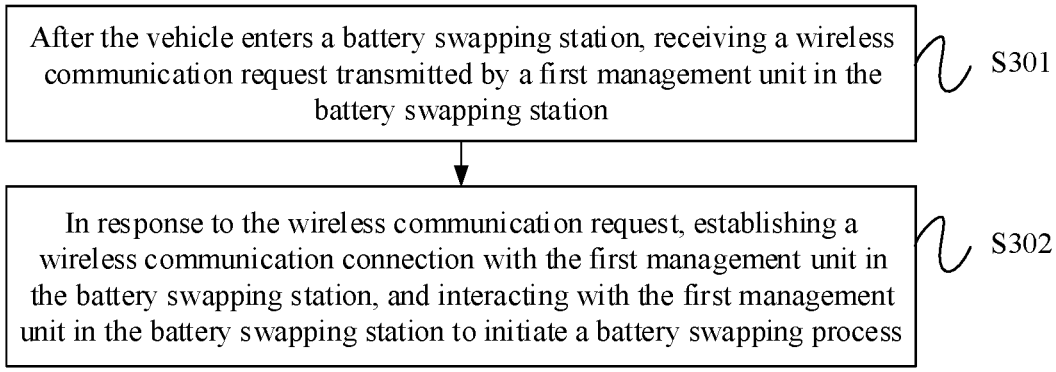
FIG. 7 is a flowchart of an embodiment of a vehicle battery swapping method applied to a second management unit provided by the present application.

The second aspect of the present application provides a vehicle battery swapping method, which may be applied to a second management unit in a vehicle. Specific contents of the vehicle and the second management unit may refer to the above-mentioned relevant description, which will not be repeated herein. The following description will be given by taking, as an example, the battery in the vehicle as a battery pack. FIG. 7 is a flowchart of an embodiment of a vehicle battery swapping method applied to a second management unit provided by the present application. As shown in FIG. 7, the vehicle battery swapping method may include step S301 and step S302.

In step S301, after the vehicle enters the battery swapping station, a wireless communication request transmitted by a first management unit in the battery swapping station is received.

The wireless communication request is transmitted by the first management unit based on an acquired target network location address. The target network location address is a network location address corresponding to a vehicle identification of the vehicle in a first binding relationship stored in the battery swapping station. The first binding relationship includes a correspondence relationship between a network location address of the second management unit of the vehicle and the vehicle identification of the vehicle.

Specific contents such as the wireless communication request, the target network location address, the first binding relationship, etc., may refer to relevant description in the above-mentioned embodiments, which will not be repeated herein.

In step S302, in response to the wireless communication request, a wireless communication connection with the first management unit in the battery swapping station is established to interact with the first management unit in the battery swapping station, to initiate a battery swapping process.

After the second management unit successfully establishes a wireless communication connection with the first management unit of the battery swapping station, the second management unit may interact with the first management unit of the battery swapping station. For example, the second management unit may interact with the first management unit to assist in information or instructions for battery swapping, such as battery status information of the battery pack in a target vehicle, charging parameter information of the battery pack, and battery swapping instructions, which is not limited herein.

In some examples, a timeout time threshold for establishing a wireless communication connection may be set. If the second management unit establishes a wireless communication connection with the first management unit within the timeout time threshold, it is considered that the second management unit successfully establishes a wireless communication connection with the first management unit. If the second management unit does not establish a wireless communication connection with the first management unit within the timeout time threshold, it is considered that the second management unit fails to establish a wireless communication connection with the first management unit. The timeout time threshold may be set based on scenarios, requirements, experiences, etc., which is not limited herein. For example, the timeout time threshold may be 10 seconds.

If the second management unit successfully establishes a wireless communication connection with the first management unit, the second management unit may maintain a power-on state to initiate the battery swapping process. If the second management unit fails to establish a wireless communication connection with the first management unit, the second management unit may enter a power-off state or a sleep state to save power.

In the embodiments of the present application, the first management unit in the battery swapping station may acquire the target network location address corresponding to the vehicle identification of the vehicle based on the first binding relationship. The second management unit of the vehicle may receive a wireless communication request initiated by the first management unit of the battery swapping station based on the target network location address to establish a wireless communication connection with the first management unit. The second management unit and the first management unit may interact through the established wireless communication connection to complete the interaction of information and instructions required for battery swapping, thereby automatically initiating the battery swapping process. After the target vehicle arrives at the entrance of the battery swapping station, the battery swapping station can automatically initiate the battery swapping process without manual operation, which improves the efficiency of battery swapping.

Figure 8:
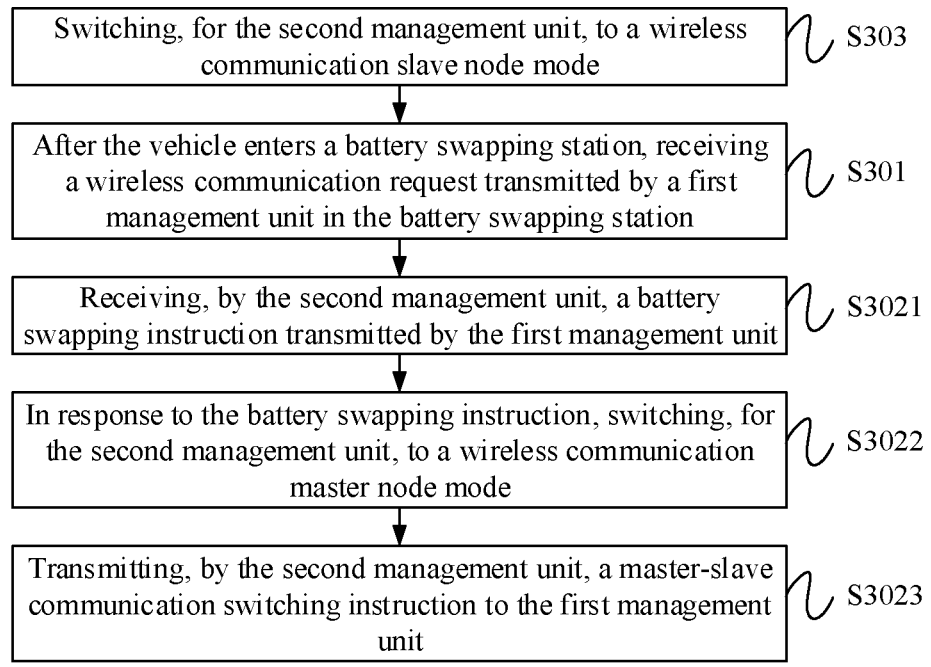
FIG. 8 is a flowchart of another embodiment of a vehicle battery swapping method applied to a second management unit provided by the present application.

In some embodiments, in order to facilitate the first management unit to initiate a wireless communication connection to the second management unit of the target vehicle, the first management unit may switch to a wireless communication master node mode, and correspondingly, the second management unit may switch to a wireless communication slave node mode. FIG. 8 is a flowchart of another embodiment of a vehicle battery swapping method applied to a second management unit provided by the present application. The difference between FIG. 8 and FIG. 7 is that the vehicle battery swapping method shown in FIG. 8 may further include step S303, and step S302 in FIG. 7 may be specifically refined into step S3021 to step S3023 in FIG. 8.

In step S303, the second management unit switches to the wireless communication slave node mode.

After the vehicle enters the battery swapping station, in order to cooperate with battery swapping, the vehicle needs to be powered off. Before the vehicle is powered off, the second management unit may be in the wireless communication master node mode and have a wireless communication connection with a third management unit of the battery pack of the vehicle, at this time, the third management unit is in the wireless communication slave node mode. Under a condition that the vehicle is powered off, after the first management unit obtains the network location address of the second management unit, the first management unit may switch to the wireless communication master node mode, and actively initiate a wireless communication request. The second management unit needs to establish a wireless communication connection with the first management unit. The second management unit may first disconnect the wireless communication connection with the third management unit, and then switch to the wireless communication slave node mode to receive and respond to the wireless communication request initiated by the first management unit to establish a wireless communication connection with the first management unit in the wireless communication master node mode.

In step S3021, the second management unit receives a battery swapping instruction transmitted by the first management unit.

The battery swapping instruction is to instruct initiation of the battery swapping process. Under a condition that the second management unit receives the battery swapping instruction, related operations of the battery swapping process may be performed.

In step S3022, in response to the battery swapping instruction, the second management unit switches to the wireless communication master node mode.

In the battery swapping process, the second management unit needs to acquire, from the third management unit of the battery pack, information of the battery pack used to assist in battery swapping, so the second management unit needs to establish a wireless communication connection with the third management unit. Correspondingly, the second management unit may switch to the wireless communication master node mode to actively initiate a wireless communication request to the third management unit to realize a wireless communication connection with the third management unit.

In step S3023, the second management unit transmits a master-slave communication switching instruction to the first management unit.

The second management unit switches to the wireless communication master node mode. Correspondingly, the first management unit and the third management unit that need to have a wireless communication connection with the second management unit need to switch to the wireless communication slave node mode. The master-slave communication switching instruction is used to instruct the first management unit to switch to the wireless communication slave node mode. The first management unit is enabled to switch to the wireless communication slave node mode through the master-slave communication switching instruction.

The second management unit switches to the wireless communication master node mode, and the second management unit may actively search for network location addresses of the first management unit and the third management unit in the wireless communication slave node mode, thereby establishing a wireless communication connection with the first management unit and the third management unit.

With the development of wireless communication technology, some wireless communication technologies no longer limit that a wireless communication request may only be initiated by a device, an apparatus, a component, etc. in the wireless communication master node mode, and a device, an apparatus, a component, etc. in the wireless communication slave node mode may also initiate a wireless communication request. In the embodiments of the present application, the first management unit, the second management unit, the third management unit, etc. may also not switch between the wireless communication master node mode and the wireless communication slave node mode, and initiate a wireless communication request normally to establish a wireless communication connection, which is not limited herein.

The second management unit of the vehicle can directly interact, via wireless communication, with the first management unit of the battery swapping station to realize the initiation of the battery swapping process, and there is no need for the whole vehicle to cooperate with the battery swapping station to communicate, and thus the applicability is stronger.

Figure 9:
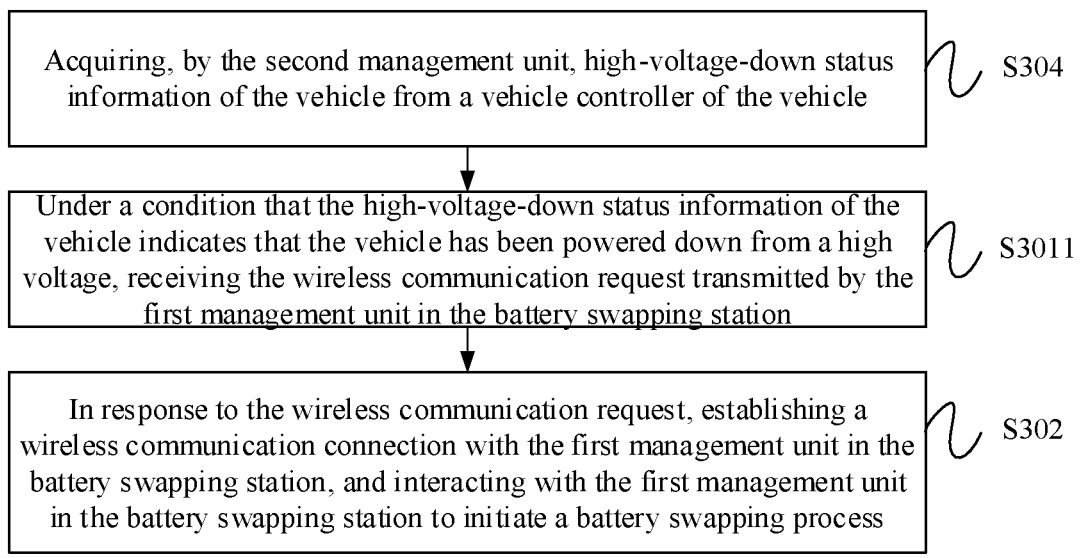
FIG. 9 is a flowchart of yet another embodiment of a vehicle battery swapping method applied to a second management unit provided by the present application.

In some embodiments, in order to improve the safety of battery swapping, the second management unit may establish a wireless communication connection with the first management unit to initiate the battery swapping process, when it is determined that the vehicle has been powered off from a high voltage. FIG. 9 is a flowchart of yet another embodiment of a vehicle battery swapping method applied to a second management unit provided by the present application. The difference between FIG. 9 and FIG. 7 is that the vehicle battery swapping method shown in FIG. 9 may further include step S304, and step S301 in FIG. 7 may be specifically refined into step S3011 in FIG. 9.

In step S304, the second management unit acquires high voltage power outage status information of the vehicle from a vehicle controller of the vehicle.

The vehicle controller may monitor a high voltage power outage state of the vehicle and generate the high voltage power outage status information. The high voltage power outage status information may indicate whether the vehicle has been powered off from a high voltage.

In step S3011, under a condition that the high voltage power outage status information of the vehicle indicates that the vehicle has been powered off from a high voltage, the wireless communication request transmitted by the first management unit in the battery swapping station is received.

Only when the vehicle has been powered off from a high voltage, the second management unit establishes the wireless communication connection with the first management unit and initiates the battery swapping process to ensure the safety and reliability of battery swapping.

Figure 10:
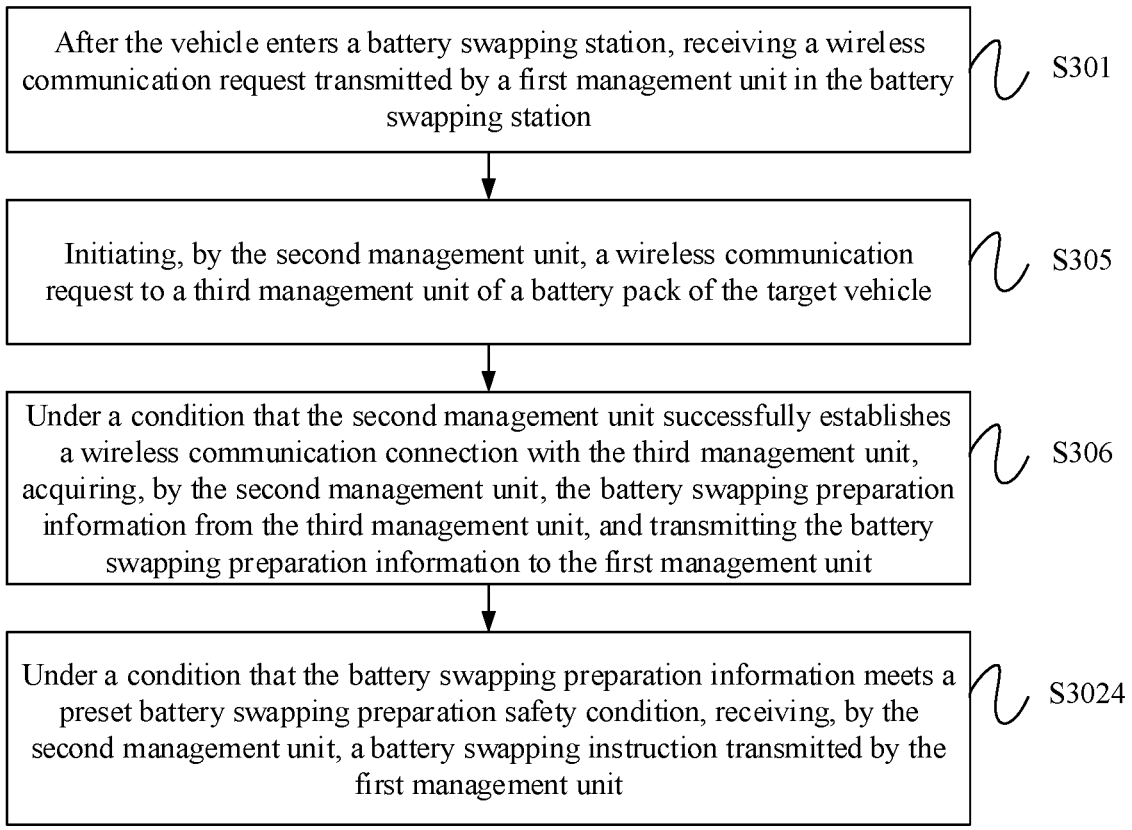
FIG. 10 is a flowchart of still another embodiment of a vehicle battery swapping method applied to a second management unit provided by the present application.

In some embodiments, in order to further ensure the safety and enforceability of battery swapping for a vehicle in the battery swapping station, the second management unit may also acquire and provide relevant information regarding the battery pack used to assist in battery swapping. FIG. 10 is a flowchart of still another embodiment of a vehicle battery swapping method applied to a second management unit provided by the present application. The difference between FIG. 10 and FIG. 7 is that the vehicle battery swapping method shown in FIG. 10 may further include step S305 and step S306, and step S302 in FIG. 7 may be specifically refined into step S3024 in FIG. 10.

In step S305, the second management unit initiates a wireless communication request to the third management unit of the battery pack of the target vehicle.

The third management unit has a wireless communication function and may be configured to monitor battery pack status information. The battery pack status information may include battery swapping preparation information of the battery pack. Specific contents of the third management unit, battery swapping preparation information, etc. may refer to relevant description in the above-mentioned embodiments, which will not be repeated herein.

In step S306, under a condition that the second management unit successfully establishes a wireless communication connection with the third management unit, the second management unit acquires the battery swapping preparation information from the third management unit and transmits the battery swapping preparation information to the first management unit.

In step S3024, under a condition that the battery swapping preparation information meets a preset battery swapping preparation safety condition, the second management unit receives a battery swapping instruction transmitted by the first management unit.

In some examples, the battery swapping preparation information includes an on-off state of a relay of the battery pack and a switch state of a battery swapping lock structure of the battery pack. The battery swapping preparation safety condition includes: the on-off state of the relay of the battery pack is an off state, and the switch state of the battery swapping lock structure of the battery pack is an unlocked state.

Specific contents of the battery swapping preparation safety condition, the battery swapping preparation information, etc. may refer to relevant description in the above-mentioned embodiments, which will not be repeated herein.

Based on the battery swapping preparation information and the battery swapping preparation safety condition, the battery swapping process is performed only when battery swapping preparation of the battery pack of the target vehicle is safe, thereby ensuring the safety and reliability of battery swapping.

Figure 11:
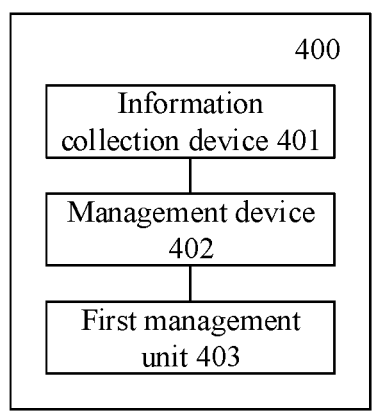
FIG. 11 is a schematic structural diagram of an embodiment of a battery swapping station provided by the present application.

The third aspect of the present application provides a battery swapping station. FIG. 11 is a schematic structural diagram of an embodiment of a battery swapping station provided by the present application. As shown in FIG. 11, the battery swapping station 400 may include an information collection device 401, a management device 402, and a first management unit 403.

The information collection device 401 may be configured to: under a condition that a target vehicle arrives at an entrance of the battery swapping station, collect a vehicle identification of the target vehicle, and upload the vehicle identification of the target vehicle to a management device 402.

The management device 402 may be configured to: obtain a target network location address based on the vehicle identification of the target vehicle and a stored first binding relationship, and deliver the target network location address to the first management unit 403, wherein the first binding relationship includes a correspondence relationship between vehicle identifications of vehicles and network location addresses of second management units in the vehicles, and the target network location address includes a network location address of a second management unit corresponding to the vehicle identification of the target vehicle in the first binding relationship.

The first management unit 403 has a wireless communication function, and is configured to: initiate a wireless communication request to the second management unit corresponding to the target network location address based on the target network location address, and under a condition that the first management unit 403 successfully establishes a wireless communication connection with the second management unit corresponding to the target network location address, initiate a battery swapping process.

In the embodiments of the present application, the battery swapping station may obtain, based on the vehicle identification of the target vehicle, the target network location address corresponding to the vehicle identification of the target vehicle in the correspondence relationship between vehicle identifications and network location addresses of second management units, that is, the network location address of the second management unit of the target vehicle. The first management unit in the battery swapping station actively establishes a wireless communication connection with the second management unit of the target vehicle, and can interact through the established wireless communication connection to complete the interaction of information and instructions required for battery swapping, thereby automatically initiating the battery swapping process. After the target vehicle arrives at the entrance of the battery swapping station, the battery swapping station can automatically initiate the battery swapping process without manual operation, which improves the efficiency of battery swapping.

In some embodiments, the first management unit 403 may also be configured to switch to a wireless communication master node mode after the management device 402 obtains the target network location address based on the vehicle identification of the target vehicle and the stored first binding relationship.

In some embodiments, the first management unit 403 may be configured to transmit a battery swapping instruction to the second management unit corresponding to the vehicle identification of the target vehicle, wherein the battery swapping instruction is to instruct initiation of the battery swapping process.

In some embodiments, the first management unit 403 may also be configured to: receive a master-slave communication switching instruction transmitted by the second management unit corresponding to the vehicle identification of the target vehicle, wherein the master-slave communication switching instruction is transmitted by the second management unit corresponding to the vehicle identification of the target vehicle in response to the battery swapping instruction; and in response to the master-slave communication switching instruction, switch from the wireless communication master node mode to a wireless communication slave node mode.

In some embodiments, the first management unit 403 may also be configured to acquire battery swapping preparation information from the second management unit corresponding to the target network location address, wherein the battery swapping preparation information is acquired by the second management unit from a third management unit of a battery pack of the target vehicle.

The first management unit 403 may be configured to: under a condition that the battery swapping preparation information meets a preset battery swapping preparation safety condition, transmit a battery swapping instruction to the second management unit corresponding to the vehicle identification of the target vehicle.

In some examples, the battery swapping preparation information includes an on-off state of a relay of the battery pack and a switch state of a battery swapping lock structure of the battery pack. The battery swapping preparation safety condition includes: the on-off state of the relay of the battery pack is an off state, and the switch state of the battery swapping lock structure of the battery pack is an unlocked state.

In some embodiments, the management device 402 may also be configured to: search the vehicle identification of the target vehicle in a pre-acquired list of vehicle identifications having a battery swapping permission, and under a condition that the vehicle identification of the target vehicle exists in the list of vehicle identifications having a battery swapping permission, allow the target vehicle to enter the battery swapping station.

The management device 402 may be configured to: under a condition that the vehicle identification of the target vehicle exists in the list of vehicle identifications having a battery swapping permission, obtain the target network location address based on the vehicle identification of the target vehicle and the stored first binding relationship.

Figure 12:
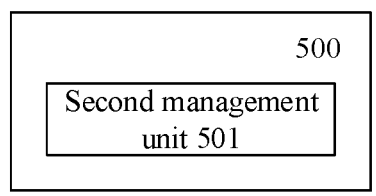
FIG. 12 is a schematic structural diagram of an embodiment of a vehicle provided by the present application.

The fourth aspect of the present application provides a vehicle. FIG. 12 is a schematic structural diagram of an embodiment of a vehicle provided by the present application. As shown in FIG. 12, the vehicle 500 may include a second management unit 501. The second management unit 501 has a wireless communication function.

The second management unit 501 may be configured to: after the vehicle enters a battery swapping station, receive a wireless communication request transmitted by a first management unit in the battery swapping station, wherein the wireless communication request is transmitted by the first management unit based on an acquired target network location address, the target network location address is a network location address corresponding to a vehicle identification of the vehicle in a first binding relationship stored in the battery swapping station, and the first binding relationship includes a correspondence relationship between a network location address of the second management unit of the vehicle and the vehicle identification of the vehicle; and in response to the wireless communication request, establish a wireless communication connection with the first management unit in the battery swapping station, and interact with the first management unit in the battery swapping station to initiate a battery swapping process.

In the embodiments of the present application, the first management unit in the battery swapping station may acquire the target network location address corresponding to the vehicle identification of the vehicle based on the first binding relationship. The second management unit of the vehicle may receive a wireless communication request initiated by the first management unit of the battery swapping station based on the target network location address to establish a wireless communication connection with the first management unit. The second management unit and the first management unit may interact through the established wireless communication connection to complete the interaction of information and instructions required for battery swapping, thereby automatically initiating the battery swapping process. After the target vehicle arrives at the entrance of the battery swapping station, the battery swapping station can automatically initiate the battery swapping process without manual operation, which improves the efficiency of battery swapping.

Figure 13:
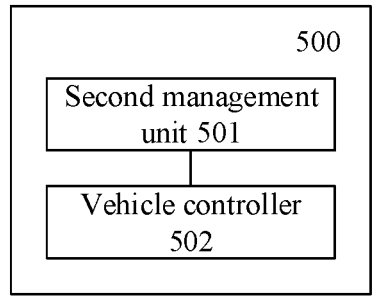
FIG. 13 is a schematic structural diagram of another embodiment of a vehicle provided by the present application.

FIG. 13 is a schematic structural diagram of another embodiment of a vehicle provided by the present application. The difference between FIG. 13 and FIG. 12 is that the vehicle 500 may further include a vehicle controller 502, which may monitor a state of the vehicle.

In some embodiments, the second management unit 501 may also be configured to switch to a wireless communication slave node mode before receiving the wireless communication request transmitted by the first management unit in the battery swapping station.

In some embodiments, the vehicle controller 502 may acquire high voltage power outage status information of the vehicle.

The second management unit 501 may also be configured to: acquire the high voltage power outage status information of the vehicle from the vehicle controller 502 of the vehicle, and under a condition that the high voltage power outage status information of the vehicle indicates that the vehicle has been powered off from a high voltage, receive the wireless communication request transmitted by the first management unit in the battery swapping station.

In some embodiments, the second management unit 501 may be configured to receive a battery swapping instruction transmitted by the first management unit, wherein the battery swapping instruction is to instruct initiation of the battery swapping process.

In some embodiments, the second management unit 501 may also be configured to: in response to the battery swapping instruction, switch to a wireless communication master node mode; and transmit a master-slave communication switching instruction to the first management unit, wherein the master-slave communication switching instruction is to instruct the first management unit to switch to a wireless communication slave node mode.

In some embodiments, the second management unit 501 is further configured to: initiate a wireless communication request to a third management unit of a battery pack of the target vehicle, wherein the third management unit has a wireless communication function and is configured to monitor battery pack status information including battery swapping preparation information of the battery pack; and under a condition that the second management unit successfully establishes a wireless communication connection with the third management unit, acquire the battery swapping preparation information from the third management unit, and transmit the battery swapping preparation information to the first management unit.

The second management unit 501 may be configured to: under a condition that the battery swapping preparation information meets a preset battery swapping preparation safety condition, receive a battery swapping instruction transmitted by the first management unit.

In some examples, the battery swapping preparation information includes an on-off state of a relay of the battery pack and a switch state of a battery swapping lock structure of the battery pack. The battery swapping preparation safety condition includes: the on-off state of the relay of the battery pack is an off state, and the switch state of the battery swapping lock structure of the battery pack is an unlocked state.

The fifth aspect of the present application provides a vehicle battery swapping system. The vehicle battery swapping system may include the battery swapping station and the vehicle in the above-mentioned embodiments. The battery swapping station may perform the vehicle battery swapping method applied to the battery swapping station in the above-mentioned embodiments. The vehicle includes a second management unit, and the second management unit may perform the vehicle battery swapping method applied to the second management unit in the above-mentioned embodiments. Specific contents of the vehicle battery swapping system may refer to relevant description in the above-mentioned embodiments, which will not be repeated herein.

It should be clear that various embodiments in the specification are described in a progressive manner, and same or similar parts among various embodiments may be referred to each other. Each embodiment focuses on differences from other embodiments. Regarding embodiments of the battery swapping station, embodiments of the vehicle and embodiments of the system, related parts may refer to description of the embodiments of the method.

Various aspects of the present application are described above with reference to flowcharts and/or block diagrams of the methods, devices (systems) and computer program products according to the embodiments of the present application. It should be understood that each block in the flowcharts and/or block diagrams and a combination of blocks in the flowcharts and/or block diagrams can be implemented by computer program instructions. These computer program instructions can be provided to a processor of a general-purpose computer, a special-purpose computer, or other programmable data processing device to produce a machine that cause these instructions executed via a processor of a computer or other programmable data processing device to enable realization of functions/actions specified in one or more blocks of the flowcharts and/or block diagrams. Such a processor can be, but is not limited to, a general-purpose processor, a dedicated processor, a special application processor, or a field programmable logic circuit. It can also be understood that each block in the block diagrams and/or flowcharts and a combination of blocks in the block diagrams and/or flowcharts can also be implemented by dedicated hardware that performs a specified function or action, or can be implemented by a combination of dedicated hardware and computer instructions.

Although the present application has been described with reference to preferred embodiments, various modifications may be made thereto and components thereof may be replaced with their equivalents, without departing from the scope of the present application. In particular, as long as there is no structural conflict, various technical features mentioned in various embodiments can be combined in any manner. The present application is not limited to the specific embodiments disclosed herein, and instead, includes all the technical solutions that fall within the scope of the claims.

What is claimed is:

1. A vehicle battery swapping method applied to a battery swapping station, wherein the battery swapping station comprises a first management unit having a wireless communication function, and characterized in that the method comprises:
    under a condition that a target vehicle arrives at an entrance of the battery swapping station, collecting a vehicle identification of the target vehicle;
    obtaining a target network location address based on the vehicle identification of the target vehicle and a stored first binding relationship, wherein the first binding relationship comprises a correspondence relationship between vehicle identifications of vehicles and network location addresses of second management units in the vehicles, and the target network location address comprises a network location address of a second management unit corresponding to the vehicle identification of the target vehicle in the first binding relationship;
    switching, for the first management unit, to a wireless communication master node mode and, based on the target network location address, initiating, by the first management unit, a wireless communication request to the second management unit corresponding to the target network location address; and
    under a condition that the first management unit successfully establishes a wireless communication connection with the second management unit corresponding to the target network location address, interacting with the second management unit corresponding to the target network location address to initiate a battery swapping process,
  characterized in that
  the interacting with the second management unit corresponding to the target network location address comprises:
    transmitting, by the first management unit, a battery swapping instruction to the second management unit corresponding to the vehicle identification of the target vehicle, wherein the battery swapping instruction is to instruct initiation of the battery swapping process and
    receiving, by the first management unit, a master-slave communication switching instruction transmitted by the second management unit corresponding to the vehicle identification of the target vehicle, wherein the master-slave communication switching instruction is transmitted by the second management unit corresponding to the vehicle identification of the target vehicle in response to the battery swapping instruction; and
    in response to the master-slave communication switching instruction, switching, for the first management unit, from a wireless communication master node mode to a wireless communication slave node mode.

2. The method of claim 1, wherein the interacting with the second management unit corresponding to the target network location address further comprises:
    acquiring, by the first management unit, battery swapping preparation information from the second management unit corresponding to the target network location address, wherein the battery swapping preparation information is acquired by the second management unit from a third management unit of a battery pack of the target vehicle;
    the transmitting, by the first management unit, a battery swapping instruction to the second management unit corresponding to the vehicle identification of the target vehicle comprises:

under a condition that the battery swapping preparation information meets a preset battery swapping preparation safety condition, transmitting, by the first management unit, a battery swapping instruction to the second management unit corresponding to the vehicle identification of the target vehicle.

3. The method of claim 1, wherein:
the battery swapping preparation information comprises an on-off state of a relay of the battery pack and a switch state of a battery swapping lock structure of the battery pack;
the battery swapping preparation safety condition comprises: the on-off state of the relay of the battery pack is an off state, and the switch state of the battery swapping lock structure of the battery pack is an unlocked state.

4. The method of claim 1, wherein after the collecting a vehicle identification of the target vehicle, the method further comprises:
searching the vehicle identification of the target vehicle in a pre-acquired list of vehicle identifications having a battery swapping permission;
under a condition that the vehicle identification of the target vehicle exists in the list of vehicle identifications having a battery swapping permission, allowing the target vehicle to enter the battery swapping station;
the obtaining a target network location address based on the vehicle identification of the target vehicle and a stored first binding relationship comprises:
under a condition that the vehicle identification of the target vehicle exists in the list of vehicle identifications having a battery swapping permission, obtaining the target network location address based on the vehicle identification of the target vehicle and the stored first binding relationship.

5. A vehicle battery swapping method applied to a second management unit in a vehicle, wherein the second management unit has a wireless communication function, and characterized in that the method comprises:
switching, for the second management unit, to a wireless communication slave node mode,
after the vehicle enters a battery swapping station, receiving a wireless communication request transmitted by a first management unit in the battery swapping station, wherein the wireless communication request is transmitted by the first management unit based on an acquired target network location address, the target network location address is a network location address corresponding to a vehicle identification of the vehicle in a first binding relationship stored in the battery swapping station, and the first binding relationship comprises a correspondence relationship between a network location address of the second management unit of the vehicle and the vehicle identification of the vehicle; and
in response to the wireless communication request, establishing a wireless communication connection with the first management unit in the battery swapping station, and interacting with the first management unit in the battery swapping station to initiate a battery swapping process,
characterized in that
the interacting with the first management unit in the battery swapping station comprises:
receiving, by the second management unit, a battery swapping instruction transmitted by the first management unit, wherein the battery swapping instruction is to instruct initiation of the battery swapping process;
in response to the battery swapping instruction, switching, for the second management unit, to a wireless communication master node mode; and
transmitting, by the second management unit, a master-slave communication switching instruction to the first management unit, wherein the master-slave communication switching instruction is to instruct the first management unit to switch to a wireless communication slave node mode.

6. The method of claim 5, wherein before the receiving a wireless communication request transmitted by a first management unit in the battery swapping station, the method further comprises:
acquiring, by the second management unit, high voltage power outage status information of the vehicle from a vehicle controller of the vehicle;
the receiving a wireless communication request transmitted by a first management unit in the battery swapping station comprises:
under a condition that the high voltage power outage status information of the vehicle indicates that the vehicle has been powered off from a high voltage, receiving the wireless communication request transmitted by the first management unit in the battery swapping station.

7. The method of claim 6, further comprising:
initiating, by the second management unit, a wireless communication request to a third management unit of a battery pack of the vehicle, wherein the third management unit has a wireless communication function and is configured to monitor battery pack status information comprising battery swapping preparation information of the battery pack;
under a condition that the second management unit successfully establishes a wireless communication connection with the third management unit, acquiring, by the second management unit, the battery swapping preparation information from the third management unit, and transmitting the battery swapping preparation information to the first management unit;
the receiving, by the second management unit, a battery swapping instruction transmitted by the first management unit comprises:
under a condition that the battery swapping preparation information meets a preset battery swapping preparation safety condition, receiving, by the second management unit, a battery swapping instruction transmitted by the first management unit.

8. A battery swapping station, characterized by comprising:
an information collection device configured to: under a condition that a target vehicle arrives at an entrance of the battery swapping station, collect a vehicle identification of the target vehicle, and upload the vehicle identification of the target vehicle to a management device;
the management device configured to: obtain a target network location address based on the vehicle identification of the target vehicle and a stored first binding relationship, and deliver the target network location address to a first management unit, wherein the first binding relationship comprises a correspondence relationship between vehicle identifications of vehicles and network location addresses of second management units in the vehicles, and the target network location address comprises a network location address of a second management unit corresponding to the vehicle identification of the target vehicle in the first binding relationship; and the first management unit having a wireless communication function and configured to: switch to a wireless communication master node mode and initiate a wireless communication request to the second management unit corresponding to the target network location address based on the target network location address, and under a condition that the first management unit successfully establishes a wireless communication connection with the second management unit corresponding to the target network location address, initiate a battery swapping process, characterized in that the first management unit is further configured to transmit a battery swapping instruction to the second management unit corresponding to the vehicle identification of the target vehicle, wherein the battery swapping instruction is to instruct initiation of the battery swapping process and to receive a master-slave communication switching instruction transmitted by the second management unit corresponding to the vehicle identification of the target vehicle, wherein the master-slave communication switching instruction is transmitted by the second management unit corresponding to the vehicle identification of the target vehicle in response to the battery swapping instruction; and in response to the master-slave communication switching instruction, switch from a wireless communication master node mode to a wireless communication slave node mode.

* * * * *